Jan. 14, 1936. A. L. V. C. DEBRIE 2,027,679
CINEMATOGRAPHIC PROJECTOR
Filed Nov. 1, 1934

Inventor:
A. L. V. C. Debrie
By [signature] atty

Patented Jan. 14, 1936

2,027,679

UNITED STATES PATENT OFFICE 2,027,679

CINEMATOGRAPHIC PROJECTOR

André Léon Victor Clément Debrie, Paris, France

Application November 1, 1934, Serial No. 751,074
In France July 9, 1934

2 Claims. (Cl. 88—24)

I have noticed that in cinematographic projecting apparatuses and chiefly in portable sound film projectors wherein the available inner space is very restricted, the usual cooling provided by a blast of air sent on the lamp and on the condenser arranged between the lamp and the film is far from being sufficient.

This defect is ascribable to the fact that the centrifugal fans used therefor cause an accumulation of an unadmissible amount of hot air near the film, by reason of the tendency of this hot air of remaining stationary round the projection lamp and its auxiliary parts, only a portion of this air escaping into the atmosphere through the most direct path passing in front of the film.

In order to remove this drawback, my invention has for its object means for cooling the projector according to which the hot air which has a tendency of accumulating between the lamp and the film is removed by means of a suction of fresh air. This arrangement should be furthered by means ensuring the maximum efficiency therefor. To this end, in particular, the lamp should be arranged at the upper part of the projector with its cap directed upwards. Thus the central part of the projector is free from cumbersome parts such as current leads, contacts, lamp supports, which are thus transferred to the upper part of the projector.

This arrangement also provides in the case of sound film projectors, the advantage that the lamp disposed as stated, may serve both for projecting and for illuminating the photo-electric cell used for sound-reading.

I have shown by way of example a form of execution of my invention in accompanying drawing whereof.

Figure 1:
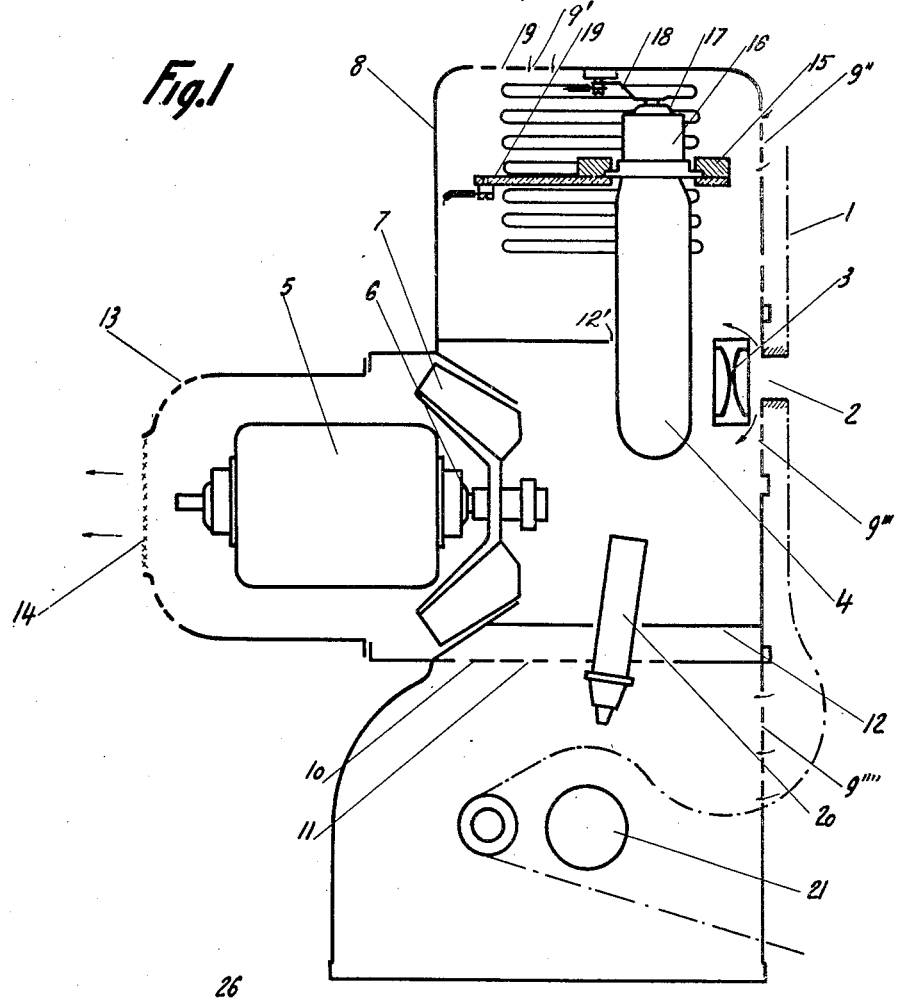
Fig. 1 is a diagrammatical vertical cross-section of a sound projector including the improvements which are the object of my invention.

In the form of execution of Fig. 1, the film 1 passes in front of the gate 2 of the casing 8 and of the condenser 3 arranged in front thereof inside the casing. The lamp is at 4 at the upper end of the casing and the motor 5 housed inside the projection drives the mechanism not shown. To the shaft 6 of the motor and in front of the latter is keyed a suction fan 7 with helical blades.

The casing 8 is provided with a large number of perforations 9, 9', 9'', 9''', 9'''' allowing the entrance of air round the source of light, the condenser and the projection gate. These perforations, preferably elongated, are distributed over the largest surface possible over the upper, side and front faces of the projector. In particular the front face is perforated all round the gate 2. Moreover the partition 10 separating the upper from the lower part of the casing 8 is also provided with similar perforations 11.

In order to guide the hot air sucked away, I arrange a cylinder 12 parallel to the axis of the fan 7 and round said axis, the cylinder 12 extending up to the front wall of the casing. This cylinder shows at its upper part an aperture 12' through which the lamp 4 and the condenser 3 are adapted to pass and which serves for allowing the air entering the casing through the perforations 9, 9', 9'', 9''', 9'''' on the outside of the cylinder to pass inside the latter and thus towards the fan blades. Of course the air entering directly the cylinder through the perforations 9''' forms a current which merges into the current formed on the outside of the cylinder and is sucked together with the last mentioned current by the fan.

The air sucked by the fan, after it has swept over the surface of the lamps and of the condenser, escapes through the aperture 14 provided in the cover 13 to the rear of the projector, said opening being closed by a gate. The cover 13 may itself be perforated throughout its surface in order to further the passage of the air forced out of the casing.

In order that nothing may obstruct this ventilation, an insulating plate 15 is provided at the upper part of the casing 8 and serves for housing the socket 16 which receives the cap 17 of the lamp 4 the point of which is directed downwards. The current leads and the contacts are shown at 18 and 19 near the upper end of the casing.

In the lower part of the sound film projector shown is arranged a tube 20 which serves for mounting the optic device required for focusing on the photo-electric cell 2 used for sound-reading. As apparent, the lamp 4 serves both for projecting the film 1 while it passes in front of the gate 2 and for illuminating the photo-electric cell 21 through the tube 20 and the sound film.

It will be readily noticed, the perforations provided in the casing allow a considerable influx of fresh air which replaces the hot air surrounding the lamp, said hot air being exhausted as stated to the rear of the suction fan whereby the film cannot suffer from the heat evolved by the lamp.

Figure 2:
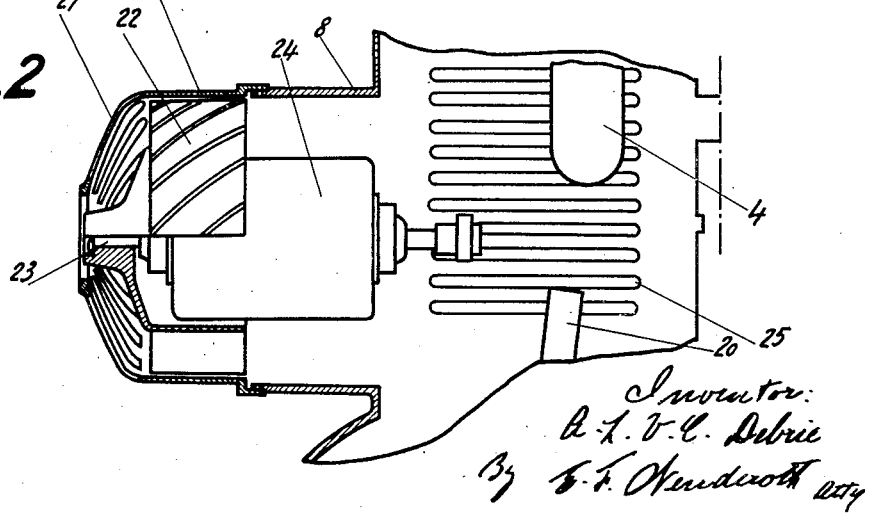
Fig. 2 is a similar view of a a detail part showing a modification in the mounting of the suction fan.

In the modification illustrated in Fig. 2, the suitably shaped fan 22 is keyed to the motor shaft 23, at the rear of the motor 24. The casing 8 provided at its front with perforations such as 25 includes a cover 26 with elongated perforations 27 above the fan blades, the remainder of the projector being similar to that shown in Fig. 1 except for the cylindric tube 12, which is omitted.

What I claim is:

1. In a cinematographic projector, the combination of a casing, a projecting gate in the said casing, a condenser to the rear of the gate, a socket in the front upper part of the casing, a projection lamp held therein with its free end pointing downwards, current terminals connected with the socket and in close proximity thereof, a motor arranged to the rear of the lamp inside the casing, a projecting mechanism driven by the motor, a fan keyed to the motor shaft behind the lamp and adapted to suck the air in front of said fan, perforations being provided in the casing round the condenser throughout the portion of the casing wall extending in front of the entire length of the lamp and to the sides thereof for allowing the entrance of fresh air into the casing transversely with reference to the axis of the lamp and perforations being provided in the casing to the rear of the motor for the outlet of the hot air.

2. In a cinematographic projector, the combination of a casing, a projecting gate in the said casing, a condenser to the rear of the gate, a socket in the front upper part of the casing, a projection lamp held therein with its free end pointing downwards, current terminals connected with the socket and in close proximity thereof, a motor arranged to the rear of the lamp inside the casing, a projecting mechanism driven by the motor, a fan keyed to the motor shaft behind the lamp and adapted to suck the air in front of said fan, a cylindrical tube passing round the fan, extending up to the front wall of the casing and having a large opening through its upper part corresponding to the location of the free end of the lamp and condenser, perforations being provided in the casing round the condenser throughout the portion of the casing wall extending in front of the entire length of the lamp and to the sides thereof for allowing the entrance of fresh air into the casing transversely with reference to the lamp and perforations being provided in the casing to the rear of the motor for the outlet of the hot air.

ANDRÉ LÉON VICTOR CLÉMENT DEBRIE.